Feb. 21, 1928.
T. E. WELSH
1,659,677
FRUIT JAR RUBBER, WASHER, OR SEALING RING
Filed Dec. 15, 1921
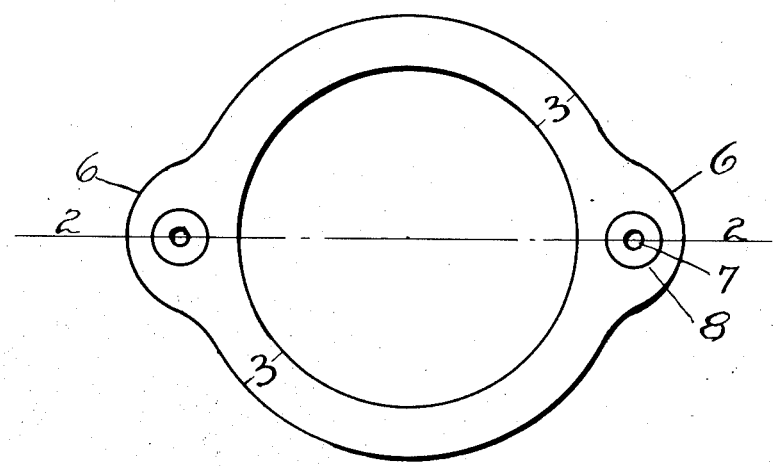
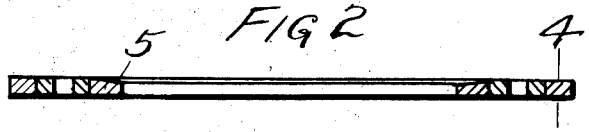
INVENTOR
Thomas E Welsh Patented Feb. 21, 1928.

1,659,677

UNITED STATES PATENT OFFICE.

THOMAS E. WELSH, OF WOODBRIDGE, CONNECTICUT.

FRUIT-JAR RUBBER, WASHER, OR SEALING RING.

Application filed December 15, 1921. Serial No. 522,690.

My invention relates to washers to be used as sealing rings for air-tight food preserving jars, such as those in common household use. These jars are usually called fruit jars, and the washers are usually called jar rubbers. These washers are placed between the body of jar and its cover, to prevent the admission of air to the inside after jar and contents have been heated and the cover placed in position. The cooling of jar and contents causes a vacuum within the jar, and a consequent air pressure on the outer sides of jar and cover so great that it is impossible for a person of ordinary strength to remove the cover without using implements, or injuring the jar or cover.

The special implements made for opening these jars are often missing when wanted, and when found are often difficult and slow in operation. Also, there is always the possibility that the body or cover of jars will be injured by these special implements.

The objects of my invention are to make possible the opening of these jars without using any implement, or exerting extraordinary strength, by so shaping and proportioning the washer that a portion of it may be pulled from between the body and cover of jar by hand. This admits air into the jar through the space formerly occupied by the portion of washer removed, with the result that pressure of air is made equal on the inner and outer sides of body and cover, so that the cover may be removed by hand. I attain these objects by using the washer illustrated in the accompanying drawing in which—

Fig. 1 is a plan view of the complete washer, and Fig. 2 is a section view on line 2—2, Fig. 1.

Similar numerals refer to similar parts throughout the several views.

The width 3 is made greater than on washers now in use for this purpose, partly to provide greater strength, and partly that the outer edges of washer may project further beyond the body or cover of jar, for a purpose to be described hereafter.

At 4 the thickness of washer is made greater than on washers now in use for this purpose, to provide greater strength.

At 5 a slight taper is given to sides of washer, making the inner edges thinner than the outer edges, to aid the washer in slipping from between the body and cover of jar when pulled. This taper is not essential.

At 6 is an extension of the washer, forming a lobe that may be grasped by the fingers and pulled until the adjacent portion, between the body and cover of the jar, is dislodged. Persons not having a grip strong enough to pull out washer as described above, may put a piece of wire, prong of a fork, or any other similar article that is handy, through the hole 7 and thus obtain a good purchase on the washer.

To prevent the washer from ripping at 7 when pulled, a disc of stronger material, preferably harder rubber than the remainder of the washer, is inserted as at 8. This disc 8 is inserted at a distance from the center of washer sufficient to avoid touching body or cover of jar, and is held to the washer by any strong adhesive applied to the edges.

Two lobes 6 are provided in case one of the lobes 6 is ripped off, and in case both lobes are torn away, the outer edges of the washer will extend so far from the body and cover of jar that it may be held by any gripping tool and pulled from between cover and body of jar. When washer is made from a strong grade of rubber, the disc 8 is probably not essential.

I claim:

1. A sealing gasket for fruit jars and the like, with a pull-tab extending outwardly from said gasket, an opening in said pull-tab filled with a material stronger than the material of the said gasket and firmly attached to said pull-tab, the stronger material having a perforation therein.

2. A sealing gasket for fruit jars and the like, with its top surface inclined near its periphery, a pull-tab extending outwardly from said gasket, an opening in said pull-tab filled with a material stronger than the material of the said gasket and firmly attached to said gasket, the stronger material having a perforation therein.

3. A sealing gasket for fruit jars and the like, with a pull-tab extending outwardly from said gasket, an opening in said pull-tab containing a material stronger than the material of said gasket and firmly attached to said pull-tab.

4. A sealing gasket for fruit jars and the like, with a pull-tab of stronger material than, but similar in composition to, the material of said gasket, said pull-tab being firmly attached to said gasket and extending horizontally therefrom.

5. A sealing gasket for fruit jars and the like, with a pull-tab extending outwardly from said gasket and a perforation in said pull-tab; the material of said gasket being less strong than a section of the same size through the material surrounding said perforation.

6. A sealing ring for fruit jars and the like, with a pull-tab extending outwardly from said gasket, the material of said pull-tab and of said gasket adjacent to said pull-tab being stronger than the material of the remainder of said gasket.

7. A sealing gasket for fruit jars and the like, composed of materials of different strength firmly attached to each other at their adjacent edges which lie in the same plane.

8. A sealing gasket for fruit jars and the like, with a perforated pull-tab extending outwardly from said gasket.

9. A sealing gasket for fruit jars and the like, with its upper and lower sides forming an angle with each other.

10. A sealing gasket for fruit jars and the like, comprising a flat ring surrounding a hole through which the fruit jar is passed, and having one or more holes through said flat ring.

11. A sealing gasket for fruit jars and the like, having perforations passing through said gasket to facilitate the removal of said gasket from beneath the cover of a sealed jar.

THOMAS E. WELSH.